Feb. 18, 1930.  R. H. HUMMERT  1,747,717
FOLDING SEAT FOR AUTOMOBILE BODIES
Filed May 4, 1927  2 Sheets-Sheet 1

INVENTOR,
Robert H. Hummert,
BY Howard S. Smith
His ATTORNEY

Feb. 18, 1930. R. H. HUMMERT 1,747,717
FOLDING SEAT FOR AUTOMOBILE BODIES
Filed May 4, 1927 2 Sheets-Sheet 2

INVENTOR
Robert H. Hummert,
BY Howard P. Smith,
His ATTORNEY

Patented Feb. 18, 1930

1,747,717

UNITED STATES PATENT OFFICE

ROBERT H. HUMMERT, OF DAYTON, OHIO, ASSIGNOR TO THE S. H. THOMSON MANUFACTURING COMPANY, OF DAYTON, OHIO, A CORPORATION OF OHIO

FOLDING SEAT FOR AUTOMOBILE BODIES

Application filed May 4, 1927. Serial No. 188,822.

This invention relates to new and useful improvements in folding seats for automobile bodies.

It is one of the principal objects of my invention to provide for automobile bodies, seats that may be folded out for convenient and quick use therein.

It is another object of my invention to provide for such seats, supporting means that may be secured in the floor or a side wall of the automobile body.

Other important and incidental objects will be brought out in the following specification and particularly set forth in the subjoined claim.

Figure 1:
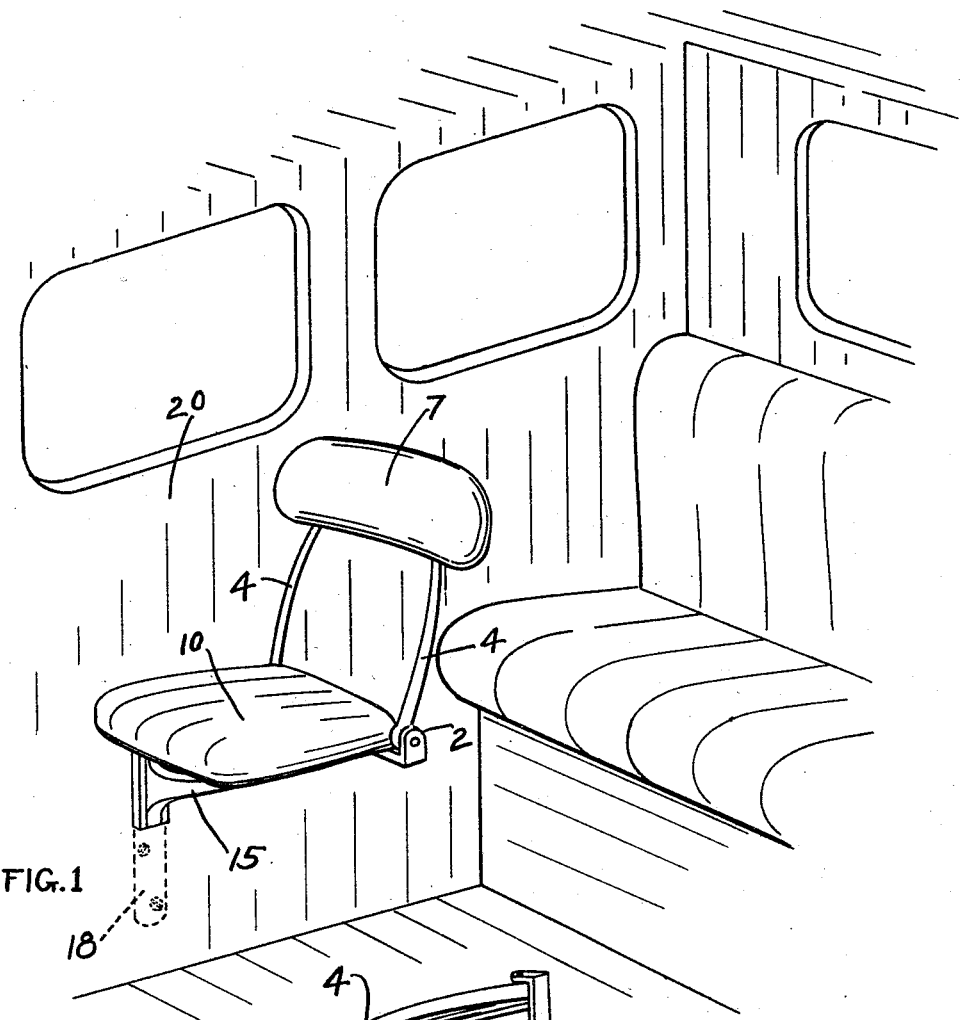
Figure 2:
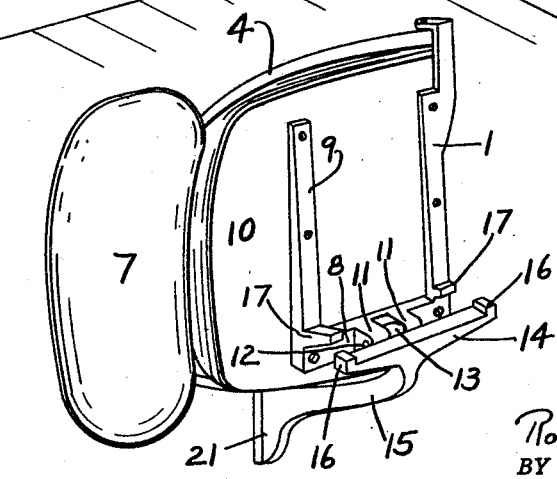
Figure 3:
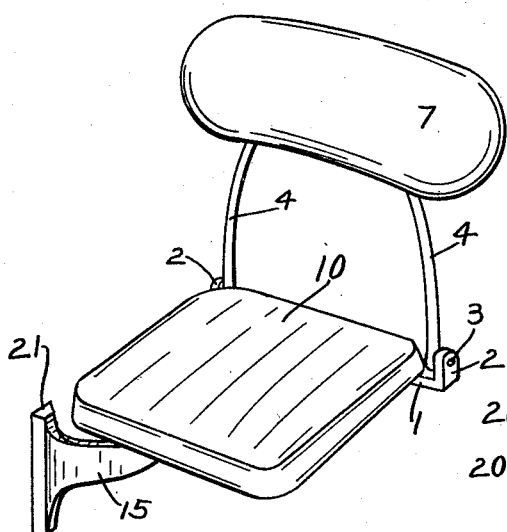
Figure 4:
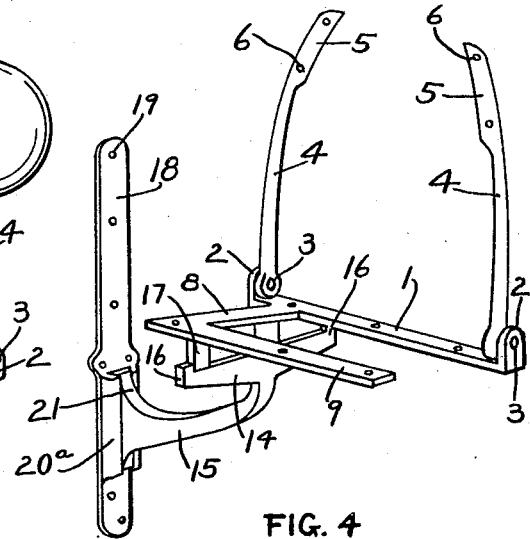
Figure 6:
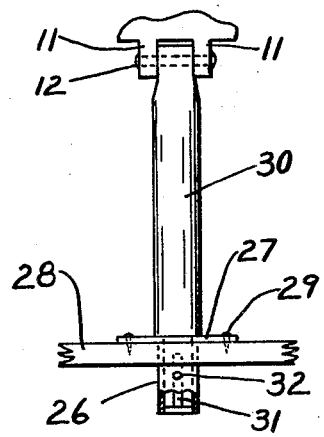
Figure 5:
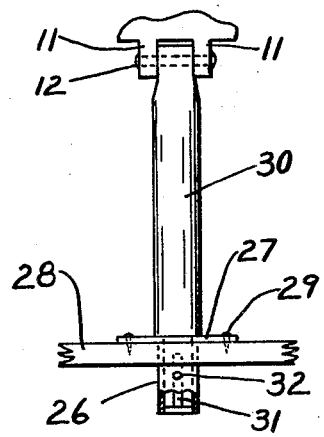

In the accompanying drawings, Figure 1 is a perspective view of the interior of an automobile body with my seat in place, such seat in this instance being removably secured to the side wall of the body. Figure 2 is a perspective view of said seat folded against the wall of said body. Figure 3 is a perspective view of my improved folding seat. Figure 4 is a perspective view of the skeleton support for said seat, inserted in a wall bracket. Figure 5 is a perspective view of a modified form of wall bracket. And Figure 6 is a detailed view of the floor support for said folding seat.

Referring to the accompanying drawings for a detailed description of my invention, the numeral 1 designates a seat supporting member formed as a casting with right-angled, upwardly projecting ends 2, 2. (See Figure 4.) Pivotally secured by a pin 3 to each end 2 of the member 1 is an inwardly curved arm 4. Each arm 4 terminates at its outer end in a flattened portion 5 formed with screw holes 6, 6. To these portions 5, 5 of the arms 4, 4, respectively, an upholstered back 7 is secured, although any other suitable back may be employed if desired.

Projecting forwardly from the member 1 is a member 8 which has a right-angled extension 9 that is parallel with the member 1, the latter, the member 8 and the extension 9 forming a horizontal frame to which an upholstered seat 10 is secured. Projecting from the bottom surface of the cross member 8 are two parallel ears 11, 11, between which there is pivotally secured by a pin 12 a right-angled projection 13 on the inner side of the cross portion 14 of a bracket arm 15. The cross portion 14 of the bracket arm 15 is formed with end flanges 16, 16, between which projections 17, 17 on the members 1 and 9 are adapted to rest upon the cross portion 14 of the bracket arm 15, when the seat is folded down. (See Figures 2 and 4.) The bracket arm 15 thus provides a firm and rigid support for the seat structure just described.

In Figures 1 and 4 I have shown an elongated wall bracket casting 18 formed with screw holes 19 for attachment to a side wall of an automobile body, such as the automobile body 20 shown in Figure 1. The bracket 18 has an enlarged grooved center part 20$^a$ to receive a vertical, insertable portion 21 of the bracket arm 15, which is curved as shown in Figure 4. It is thus possible, easily and quickly, by inserting the vertical part 21 of the bracket arm 15 in the grooved part 20 of the wall bracket 18, to secure the seat structure previously described to a side wall of the automobile body 20. When the seat is not in use, the arms 4, 4 supporting the back 7 may be folded down against the seat 10, after which said seat may be turned upon the pivot 12 against the side wall of the automobile body 20, as shown in Figure 2. When it is again desired to use the seat, it may be folded out and down to rest upon the cross portion 14 of the bracket arm 15, after which the arms 4, 4 may be moved to their vertical positions, shown in Figures 3 and 4. The seat is now ready for use, beside a cot or stretcher. (Not shown.)

My improved seat structure just described cannot only be economically manufactured and assembled, but it lends itself as one which may be easily folded out of the way in an automobile body, thus well adapting it for the use of a friend or attendant in an ambulance.

In Figure 5 I have shown a wall bracket 22 formed with the middle grooved portion 23 and a foot 24 containing a screw hole 25. This foot portion 24 enables the bracket to be secured to the floor, as well as to a side wall of the automobile body to receive the seat above described.

In Figure 6 I have shown a socket 26 formed with a flange 27 that is secured to the floor 28 of the automobile body by screws 29. This socket is adapted to receive a pedestal 30. At its lower end this pedestal is formed with a shoulder which rests upon the flange 27 of the socket, and with an axial groove 31 adapted to receive a pin 32 projecting from the socket to prevent the pedestal from turning. At its upper end the pedestal 30 is of reduced diameter and formed with a transverse hole to receive the pin 12 that is adapted to pass through holes in the ears 11, 11 on the member 8 of the seat frame, to hingedly secure the latter to the pedestal when it is desired to mount the seat on the floor 28 of the automobile.

I do not wish to be limited to the details of construction and arrangement herein shown and described, and any changes or modifications may be made therein within the scope of the subjoined claim.

Having described my invention, I claim:

A folding seat for automobile bodies, comprising a single, outwardly projecting bracket arm terminating in a right angled cross portion projecting in both directions from it formed with upwardly turned ends, a seat frame pivoted at its transverse portion to the cross portion of the bracket arm, and a pair of projections on the under part of said seat frame for engagement with the cross portion of the bracket arm between the upturned ends of said cross portion when the frame is folded down, for the purpose specified.

In testimony whereof I have hereunto set my hand this 2nd day of May, 1927.

ROBERT H. HUMMERT.